United States Patent
Chang

(10) Patent No.: US 10,603,623 B2
(45) Date of Patent: Mar. 31, 2020

(54) SERIAL-ROTOR TYPE HIGH EFFICIENCY PURIFICATION SYSTEM

(71) Applicants: JG ENVIRONMENTAL TECHNOLOGY CO., LTD., Taoyuan (TW); Feng-Tang Chang, Taoyuan (TW)

(72) Inventor: Feng-Tang Chang, Taoyuan (TW)

(73) Assignee: JG ENVIRONMENTAL TECHNOLOGY CO., LTD., Taoyuan (TW)

( * ) Notice: Subject to any disclaimer, the term of this patent is extended or adjusted under 35 U.S.C. 154(b) by 212 days.

(21) Appl. No.: 15/870,904

(22) Filed: Jan. 13, 2018

(65) Prior Publication Data

US 2018/0221810 A1    Aug. 9, 2018

(30) Foreign Application Priority Data

Feb. 3, 2017    (TW) .............................. 106103647 A

(51) Int. Cl.
*B01D 53/06*    (2006.01)
*B01D 53/34*    (2006.01)
(Continued)

(52) U.S. Cl.
CPC ........... *B01D 53/06* (2013.01); *B01D 53/343* (2013.01); *B01D 53/72* (2013.01); *B01D 53/50* (2013.01);
(Continued)

(58) Field of Classification Search
CPC ...... B01D 53/04; B01D 53/06; B01D 53/343; B01D 53/50; B01D 53/56; B01D 53/72;
(Continued)

(56) References Cited

U.S. PATENT DOCUMENTS

| 5,167,679 A | * | 12/1992 | Maekawa | .............. B01D 53/06 96/125 |
| 5,198,001 A | * | 3/1993 | Knebel | .................. B01D 53/04 95/126 |

(Continued)

FOREIGN PATENT DOCUMENTS

| CN | 104107618 A | 10/2014 |
| CN | 106139821 A | 11/2016 |

(Continued)

OTHER PUBLICATIONS

Machine-generated English translation of CN 101435582, published May 2009.*

(Continued)

*Primary Examiner* — Frank M Lawrence, Jr.
(74) *Attorney, Agent, or Firm* — Muncy, Geissler, Olds & Lowe, P.C.

(57) ABSTRACT

A serial-rotor type high efficiency purification system includes a first rotor, a second rotor and an incinerator. The first rotor has a first adsorption zone and a first desorption zone. The first adsorption zone is adapted to adsorb VOCs and expel a first adsorption-treated air. The first desorption zone is adapted for the VOCs to be desorbed and to expel a first desorption-treated air. The second rotor has a second adsorption zone and a second desorption zone. The second adsorption zone is adapted to adsorb the VOCs within the first adsorption-treated air. The incinerator is adapted to incinerate the VOCs within the first desorption-treated air. The present invention is characterized in that the first adsorption-treated air can be treated again by the second rotor, such that the VOCs concentration of the second adsorption-treated air can be significantly reduced. High processing efficiency can thus be achieved.

19 Claims, 5 Drawing Sheets

(51) Int. Cl.
*B01D 53/72* (2006.01)
*B01D 53/50* (2006.01)
*B01D 53/56* (2006.01)

(52) U.S. Cl.
CPC ........ *B01D 53/56* (2013.01); *B01D 2253/108* (2013.01); *B01D 2257/302* (2013.01); *B01D 2257/404* (2013.01); *B01D 2257/708* (2013.01); *B01D 2259/40086* (2013.01)

(58) Field of Classification Search
CPC ........ B01D 2253/108; B01D 2257/302; B01D 2257/404; B01D 2257/708; B01D 2259/40086
USPC ..... 95/113; 96/112, 126, 127, 130–132, 146
See application file for complete search history.

(56) References Cited

U.S. PATENT DOCUMENTS

| | | | | |
|---|---|---|---|---|
| 5,312,477 A | * | 5/1994 | Minor | B01D 53/04 95/105 |
| 5,695,546 A | * | 12/1997 | Izumi | B01D 53/06 95/115 |
| 5,702,505 A | * | 12/1997 | Izumi | B01D 53/06 95/115 |
| 2012/0068119 A1 | * | 3/2012 | Kametani | B01D 53/06 252/372 |
| 2018/0154303 A1 | * | 6/2018 | Giles | B01D 53/0454 |

FOREIGN PATENT DOCUMENTS

| | | |
|---|---|---|
| JP | H03288516 A | 12/1991 |
| JP | 2005161128 A | 6/2005 |
| TW | M324171 U | 12/2007 |
| TW | I318282 B | 12/2009 |
| TW | 201027008 A | 7/2010 |
| TW | M444870 | 1/2013 |

OTHER PUBLICATIONS

Machine-generated English translation of CN 104107618, published Oct. 2014.*

\* cited by examiner

SERIAL-ROTOR TYPE HIGH EFFICIENCY PURIFICATION SYSTEM

BACKGROUND OF THE INVENTION

Field of the Invention

The present invention relates generally to a volatile organic compounds processing system, and more particularly to a processing system utilizing rotors and an incinerator.

Description of the Prior Art

Organic Solvents are commonly used in many fields. Some organic solvents tend to evaporate from the liquid form and enter the surrounding air and are thus known as "Volatile Organic Compounds", hereinafter referred to as "VOCs". Many VOCs have biotoxicity and must be processed before emitting to the atmosphere.

A common way to process the VOCs is the utilization of incinerators to incinerate the VOCs. To treat exhaust air containing low concentrations of VOCs, an adsorption-desorption rotor is usually used to concentrate the VOCs. The existing high efficiency rotor can usually reach a VOCs processing efficiency of 90-95%, with a concentration ratio of 10-25, i.e. the concentration of VOCs in the desorption air is 10-25 times that in the exhaust air. The desorption air is then sent through the incinerator. Even though the existing incinerator can reach a VOCs processing efficiency of 95-99%, the exhaust end of the incinerator still contains some VOCs due to the high concentration ratio of 10-25 in the desorption air.

Owing to the fact that the environmental regulations and the emission standards become stricter and stricter, the existing exhaust air processing systems cannot entirely meet the reduction standards in Air Pollutants Total Control Plan. Therefore, it is of deep concern for the persons skilled in this art to find a solution to increase the processing efficiency of the VOCs processing system.

On the other hand, the airstream expelled from the exhaust end of the conventional incinerator still contains low concentrations of VOCs. Pollutants such as $NO_x$, $SO_x$ or suspended solids may also be generated. Air Quality Monitoring Data has shown that the particulate matters are gradually replaced by the pollutants including VOCs, $NO_x$, $SO_x$ and suspended solids as the primary source which contributes to Pollutant Standards Index. VOCs, $NO_x$, $SO_x$ and suspended solids are also on the reduction standard lists in Air Pollutants Total Control Plan. Therefore, there is a need to strictly reduce the emission of VOCs, $NO_x$, $SO_x$ and suspended solids.

To process VOCs, a Taiwanese utility module numbered M444870, hereinafter referred to as "M444870", discloses a VOCs Secondary Concentration System. FIG. 1 of M444870 shows a conventional method using incinerator to process the desorption air expelled from the rotor. To mitigate its defects, a second rotor as shown in FIG. 2 of M444870 or more rotors as shown in FIG. 4 thereof can be utilized to further process the desorption air expelled from the first rotor, while the desorption air expelled from the second rotor is still processed by an incinerator, which is not shown in the figure. However, the VOCs processing efficiency of a rotor is usually lower than that of an incinerator. Despite that M444870 attempts to replace the incinerator with the additional rotor(s) to process the desorption air expelled from the first rotor, the nature of the lower VOCs processing efficiency of the additional rotor(s) makes the concentration of VOCs in the processed air even higher than what it would be in the method as disclosed in FIG. 1 of M444870. As a result, M444870 builds up higher equipment cost by installed additional rotor(s), and yet the concentration of VOCs in the processed air is not lowered but increased.

SUMMARY OF THE INVENTION

In view of the fact that existing VOCs processing technologies are gradually unable to meet the standards regulated in Air Pollutants Total Control Plan, the primary object of the present invention is to provide a high efficiency VOCs processing system.

To achieve the above and other objects, the present invention provides a serial-rotor type high efficiency purification system for processing exhaust air containing VOCs. The system includes a first rotor, a second rotor and an incinerator. The first rotor has a first adsorption zone and a first desorption zone. The first adsorption zone is adapted for the exhaust air to be sent therethrough in a manner that at least a part of the VOCs within the exhaust air are adsorbed, and the first adsorption zone is also adapted to expel the exhaust air as a first adsorption-treated air. The first desorption zone is adapted for a first desorption air to be sent therethrough in a manner that the VOCs adsorbed by the first rotor are desorbed, and the first desorption zone is also adapted to expel the first desorption air as a first desorption-treated air. The second rotor has a second adsorption zone and a second desorption zone. The second adsorption zone is adapted for the first adsorption-treated air to be sent therethrough in a manner that at least a part of the VOCs within the first adsorption-treated air are adsorbed, and the second adsorption zone is also adapted to expel the first adsorption-treated air as a second adsorption-treated air. The second desorption zone is adapted for a second desorption air to be sent therethrough in a manner that the VOCs adsorbed by the second rotor are desorbed, and the second desorption zone is adapted to expel the second desorption air as a second desorption-treated air. The incinerator has a combustion unit, an intake end and an exhaust end. The intake end and the exhaust end are both in communication with the combustion unit. The intake end is adapted for the first desorption-treated air to be sent through the combustion unit via the intake end. The combustion unit is adapted to incinerate the VOCs within the first desorption-treated air and then generate an incinerated air. The exhaust end is adapted to expel at least a part of the incinerated air.

In light of the foregoing, the present invention is characterized in that the first adsorption-treated air processed by the first rotor can be treated again by the second rotor using adsorption process. Therefore, the concentration of VOCs in the second adsorption-treated air could be significantly lower than that in the processed air utilizing conventional technologies. High VOCs processing efficiency can thus be achieved.

In other possible examples of the present invention, the incinerated air expelled from the incinerator may be sent through the first or the second rotor for adsorption treatment, or can be sent through the first or the second rotor as the desorption air. Therefore, the amount of the incinerated air expelled to the surrounding can be reduced. Zero emission of the incinerated air becomes possible. Total amount of the emitted VOCs can be thus further reduced.

In other possible examples of the present invention, the incinerated air expelled from the incinerator can be purified by an additional purification reactor to further reduce the emission of the pollutants such as VOCs, $NO_x$, $SO_x$ or suspended solids.

DETAILED DESCRIPTION OF THE PREFERRED EMBODIMENTS

Figure 1:
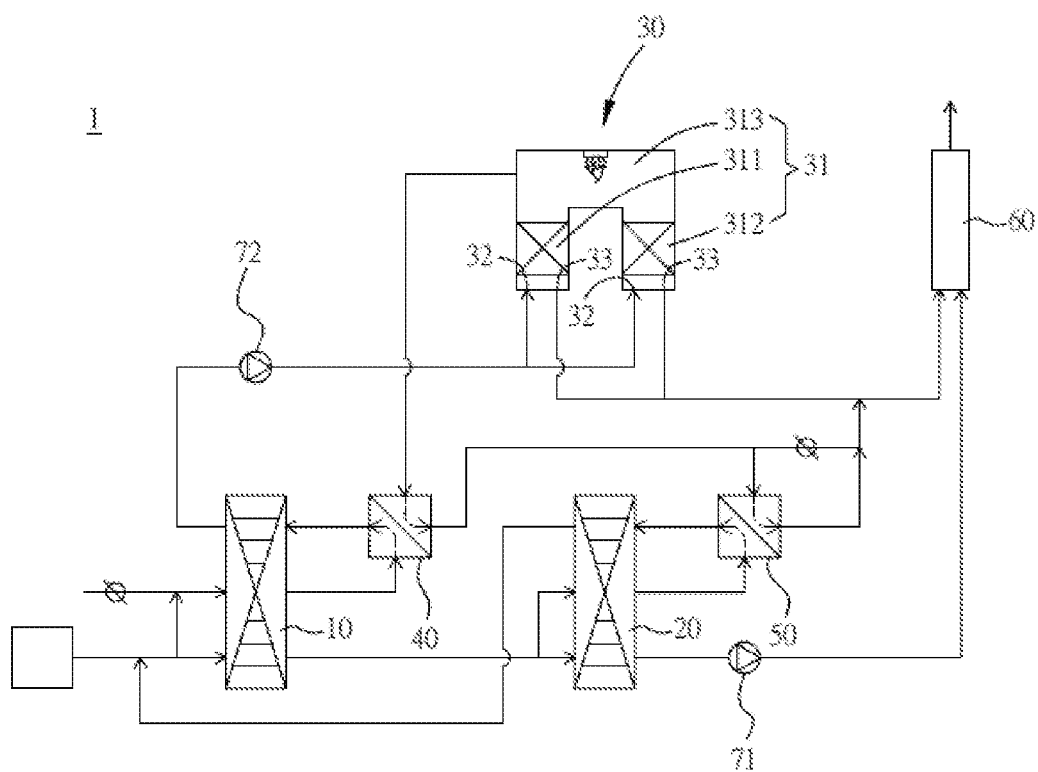
FIG. 1 is a configuration diagram in accordance with the first embodiment of the present invention.

Please refer to FIG. 1 for a serial-rotor type high efficiency purification system, hereinafter referred to as "purification system". The purification system includes a first rotor 10, a second rotor 20, an incinerator 30, a first heat exchanger 40, a second heat exchanger 50 and a chimney 60. The purification system is adapted for processing VOCs-containing exhaust air. The exhaust air may come from petrochemical process, process utilizing organic solvents or burned gases. The VOCs contained within the exhaust air may be, but not limited to, toluene, xylene, p-xylene, ethyl benzene, styrene, formaldehyde, acetaldehyde, IPA, PGMEA, HMDS, trichlorethylene (TCE), monoethanolamine (MEA) and dimethyl sulfoxide (DMSO). Other possible VOCs may be alkanes, aromatic hydrocarbons, alkenes, halogenated hydrocarbons, esters, aldehydes and ketones.

Figure 2:
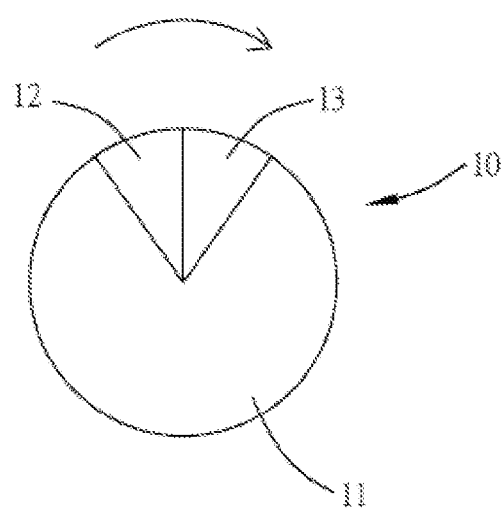
FIG. 2 is a front view of a rotor adapted to be utilized in the present invention.

Please refer to FIG. 2. When the first rotor 10 is working, it rotates in a rotation direction. The first rotor 10 may be divided into a first adsorption zone 11, a first desorption zone 12 and a first cooling zone 13 based on the desired purposes, in which the first cooling zone 13 is disposed between the first adsorption zone 11 and the first desorption zone 12. Adsorption material(s) carried by the first rotor 10 may rotate through the first adsorption zone 11, the first desorption zone 12 and the first cooling zone 13 in sequence. Adsorption material(s) is chosen based on the VOCs to be adsorbed in this stage, and the adsorption material(s) may be, but not limited to, hydrophilic or hydrophobic zeolite, active charcoal, active aluminium oxides, silicone or the combination thereof The hydrophilic zeolite, for instance, can be A-type, 13X-type or low silica-alumina ratio Y-type zeolite. The hydrophobic zeolite, on the other hand, can be ZSM-5-type, MCM-type or high silica-alumina ratio Y-type zeolite. The MCM-type zeolite can be M41S-group zeolite such as hexagonal MCM-41, cubic MCM-48 or lamellar MCM-50 zeolite.

Similar to the first rotor 10, the wheel of the second rotor 20 may also be divided into a second adsorption zone, a second desorption zone and a second cooling zone. The front view of the second rotor 20 is similar to what is shown in FIG. 2. The second cooling zone is disposed between the second adsorption zone and the second desorption zone. Adsorption material(s) carried by the second rotor 20 can rotate through the second adsorption zone, the second desorption zone and the second cooling zone in sequence. Adsorption material(s) carried by the second rotor can be identical or different to that carried by the first rotor, based on the VOCs to be adsorbed in this stage. While they are not shown in the drawings, the first and the second rotors 10, 20 may still be constructed by frames, a hub, a support base and other units, which are not substantially involved in the adsorption process and the desorption process.

The incinerator 30 has a combustion unit 31, an intake end 32 and an exhaust end 33. In the present invention, the incinerator may be, but not limited to, a recuperative thermal oxidizer, a regenerative thermal oxidizer or a catalyst thermal oxidizer, in which the regenerative thermal oxidizer may be two-tank type, three-tank type or rotary valve type. In the present embodiment, the incinerator 30 is a two-tank regenerative thermal oxidizer, and thus the combustion unit 31 has two regenerative thermal tanks 311, 312 and a combustion chamber 313 bridging these two regenerative thermal tanks 311, 312. Each regenerative thermal tanks 311, 312 has the intake end 32 and the exhaust end 33. Those pipes in communication with these intake ends 32 and the exhaust ends 33 are regulated by a control valve module, which is not shown in the drawings. The control valve module is operated in a manner that only one of the regenerative thermal tanks 311, 312 has an open intake end 32 while only the other one of the regenerative thermal tanks 311, 312 has an open exhaust end 33. The control valve module controls the open/close of the intake ends 32 and the exhaust ends 33 so as to periodically adjust the air flow direction. The air flow may either flow through the regenerative thermal tank 311, the combustion chamber 313 and the regenerative thermal tank 312 in sequence, or it may flow through the regenerative thermal tank 312, the combustion chamber 313 and the regenerative thermal tank 311 in sequence. The regenerative thermal tanks 311, 312 are filled with heat media for heat exchangement with the air flowing through the incinerator 30. The heat media may be, but not limited to, alumina oxide porcelain, Mullite, Cordierite or other regenerative thermal ceramics or gravels.

Each of the first and the second heat exchangers 40, 50 is adapted for two air flows to exchange heat therein. The afore-mentioned "exchange heat" means that thermal energy transfer is made from the hotter air flow to the colder air flow. The heat exchangers may be, but not limited to, plate coil heat exchangers, plate heat exchangers and shell and tube heat exchangers. The incinerator 30 may detach a part of incinerated gas from the combustion chamber 313 of the combustion unit 31 to the first and the second heat exchangers as the afore-mentioned hotter air flow. In the present embodiment, the incinerated air used as the hotter air flow flows through the first heat exchanger 40 and the second heat exchanger 50 in sequence.

The purification system 1 can be used in a serial-rotor type high efficiency purification method, hereinafter referred to as "purification method". The purification method includes the following procedures:

[First adsorption procedure] Feeding the VOCs-containing exhaust air through the first adsorption zone 11 of the first rotor 10 in a manner that at least a part of the VOCs within the exhaust air is adsorbed by the adsorption material(s) within the first adsorption zone 11. The processed exhaust air is then expelled from the other side of the first rotor 10 as a first adsorption-treated air.

[Second adsorption procedure] Feeding the first adsorption-treated air through the second adsorption zone of the second rotor 20 in a manner that at least a part of the VOCs within the first adsorption-treated air is adsorbed by the adsorption material(s) within the second adsorption zone. The processed first adsorption-treated air is then expelled from the other side of the second rotor 20 as a second adsorption-treated air. The second adsorption-treated air, processed by two adsorption procedures, contains very small amount of VOCs, and thus the second adsorption-treated air may be expelled to the outside, with the help of a fan 71, via the chimney 60 or be utilized otherwise.

[First desorption procedure] The adsorption material(s) adsorbed an adequate amount of VOCs during the first adsorption procedure, and thus a first desorption air is fed through the first desorption zone 12 of the first rotor 10 in a manner that the VOCs adsorbed by the first rotor 10 are desorbed. The processed first desorption air thus contains higher concentration of VOCs and is then expelled from the other side of the first rotor 10 as a first desorption-treated air. To increase the desorption efficiency, the first desorption air may be heated to a higher temperature. In the present embodiment, the first desorption air is heated up, before entering the first desorption zone 12, by feeding it into the first cooling zone 13 for preheatment and then further feeding it into the first heat exchanger 40 for heat exchangement with the incinerated air. In the present embodiment, the first desorption air is composed of clean air and a part of the exhaust air, however other compositions are possible.

[Second desorption procedure] The adsorption material(s) of the second rotor 20 adsorbed an adequate amount of VOCs during the second adsorption procedure, and thus a second desorption air is fed through the second desorption zone of the second rotor 20 in a manner that the VOCs adsorbed by the second rotor 20 are desorbed. The processed second desorption air thus contains higher concentration of VOCs and is then expelled from the other side of the second rotor 20 as a second desorption-treated air. To increase the desorption efficiency, the second desorption air may also be heated to a higher temperature. In the present embodiment, the second desorption air is heated up, before entering the second desorption zone, by feeding it into the second cooling zone for preheatment and then further feeding it into the second heat exchanger 50 for heat exchangement with the incinerated air. In the present embodiment, the second desorption air is a detached flow of the first adsorption-treated air. Because the concentration of VOCs in the second desorption-treated air is usually similar to that in the exhaust air, the second desorption-treated air may join the exhaust air and then fed through the first adsorption zone 11 of the rotor 10 for an additional first adsorption procedure. The residual heat of the second desorption-treated air may increase the temperature of the exhaust air before entering the first adsorption zone 11. Relative humidity of the exhaust air may also be lowered. The VOCs processing efficiency of the first rotor 10 can also be increased. Under such circumstances, it is advised that the adsorption material(s) carried by the first rotor 10 may be hydrophobic zeolite.

[Incineration procedure] The first desorption-treated air containing higher concentration of VOCs is sent to the combustion unit 31 via the intake end 32 with the help of another fan 72. The combustion unit 31 then incinerate the VOCs within the first desorption-treated air and generate the incinerated air. A part of the incinerated air is expelled via the exhaust end 33, while the other part of the incinerated air is detached from the combustion chamber 313 of the combustion unit 30 and is used for heat exchangement. After the heat exchangement, the detached incinerated air rejoins the incinerated air expelled via the exhaust end 313. The confluence of the incinerated air is then expelled via the chimney 60 or is utilized otherwise.

The nature of rotors makes the first adsorption procedure, the second adsorption procedure, the first desorption procedure and the second desorption procedure take place synchronously. In a routine operation, the incineration procedure also takes place synchronously.

In a numerical simulation, the purification system 1 is introduced with 2000 SCMM($m^3$/min) of the exhaust air, which contains 20 ppmv of VOCs. After the exhaust air merges 100 SCMM of the second desorption-treated air, 1975 SCMM of the confluence is sent to the first adsorption zone of the rotor 10 for the first adsorption procedure, while the remaining 125 SCMM of the confluence is used as the first desorption air and is introduced through the first desorption zone for the first desorption procedure. It is assumed that the VOCs processing efficiency of the first rotor 10 is 95% while the concentration ratio thereof is about 16, that the VOCs processing efficiency of the second rotor 20 is 90% while the concentration ratio thereof is about 17, and that the VOCs processing efficiency of the incinerator 30 is 98%. Under such conditions, 1975 SCMM of the first adsorption-treated air contains only 1 ppmv of VOCs. 1875 SCMM of the first adsorption-treated air is then sent through the second desorption zone of the second rotor 20 for the second adsorption procedure. The second desorption-treated air thus contains only 0.1 ppmv and is then sent through the chimney 60. On the other hand, 100 SCMM of the first adsorption-treated air is used as the second desorption air and is sent through the second desorption zone of the second rotor 20. 100 SCMM of the second desorption-treated air is generated with a VOCs concentration of about 17 ppmv, and it is then merged into the exhaust air to increase the air temperature and lower the relative humidity. Furthermore, the first desorption-treated air generated in the first desorption procedure has a VOCs concentration of about 320 ppmv. 125 SCMM of the first desorption-treated air is then sent to the incinerator 30 for the incineration procedure. 15 SCMM of the incinerated air is sent to the first and the second heat exchanger 40, 50 in sequence for heat exchangement, and then rejoins the remaining 110 SCMM of the incinerated air. Thereafter, 125 SCMM of the incinerated air contains about 6.4 ppmv of VOCs and is then sent to the chimney. As a whole, 2000 SCMM of the treated air is expelled from the chimney with only 0.5 ppmv of VOCs. In other words, 97.5% of the VOCs has been removed, which is an excellent processing efficiency.

Compared with conventional purification systems, the present invention can significantly reduce the VOCs concentrations within the treated air without adding additional incinerators, assuming that there is usually an incinerator in conventional systems. Heat can be sufficiently recoverred. Energy conservation can thus be achieved.

Figure 3:
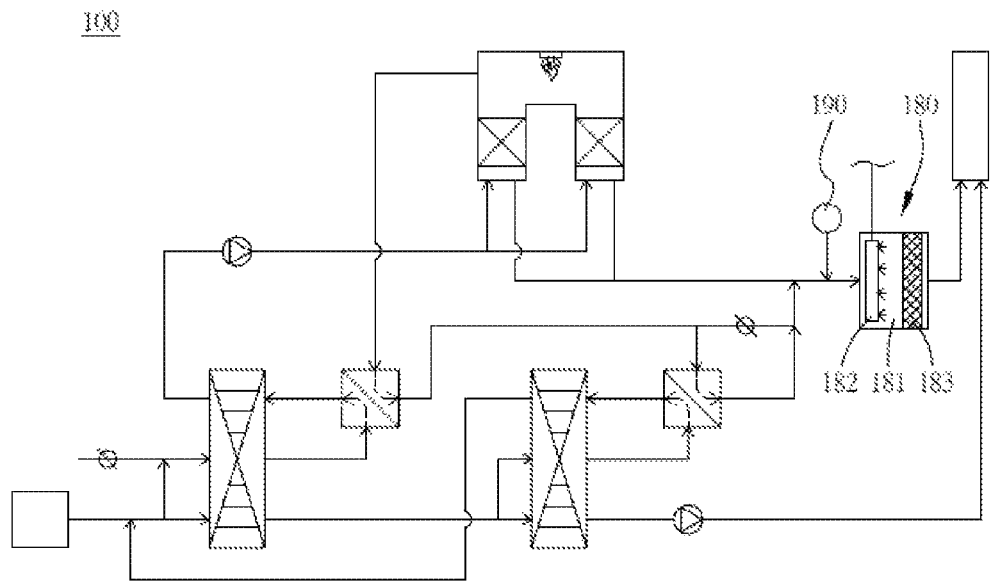
FIG. 3 is a configuration diagram in accordance with the second embodiment of the present invention.

Please refer to FIG. 3 the purification system in accordance with the second embodiment of the present invention. The purification system is partially similar to what disclosed in the first embodiment, but is different in the fact that the purification system 100 of the second embodiment further includes a repurification reactor 180 and an ozone supply unit 190. The ozone supply unit 190 is adapted to supply the incinerated air with ozone. The repurification reactor 180 has a reaction chamber 181 and a water supply unit 182 disposed in the reaction chamber 181. The water supply unit

182 may be, for instance, a nozzle used to increase the moisture content within the reaction chamber 181. The reaction chamber 181 may be further disposed with catalyst material 183. A repurification procedure can thus be achieved by introducing ozone into the reaction chamber 181 such that ozone and moisture can react in the reaction chamber 181 to generate highly active hydroxyl radicals, which can be used to react with possible $NO_x$ (insoluble in water) in the incinerated air to generate nitric acid (highly soluble in water), to react with possible $SO_x$ (insoluble in water) to generate sulfuric acid (highly soluble in water), or to react with possible high boiling organic suspended solids to generate carbon dioxide and water. Purified air can be thus obtained.

In a numerical simulation, the incinerated air originally contains 4.24 ppmv of VOCs, 100 ppmv of $NO_x$, 5 ppmv of $SO_x$ and 1 mg/$Nm^3$ of suspended solids. After the repurification procedure, the purified air contains only 0.424 ppmv of VOCs, 20 ppmv of $NO_x$, 0.5 ppmv of $SO_x$ and 0.5 mg/$Nm^3$ of suspended solids. The concentration of air pollutants in the treated air can be further reduced.

Figure 4:
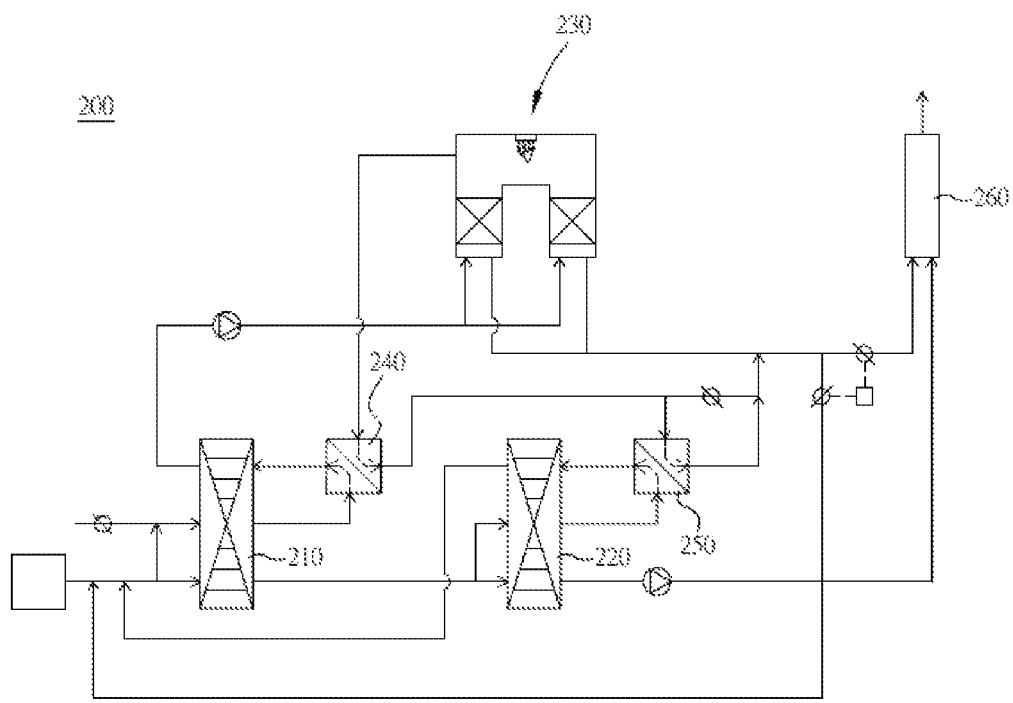
FIG. 4 is a configuration diagram in accordance with the third embodiment of the present invention.

Please refer to FIG. 4 for the purification system in accordance with the third embodiment of the present invention. The purification system 200 of the present embodiment is different from that in the first embodiment in the fact that the incinerated air, which contains low concentrations of VOCs, is merged into the exhaust air in routine procedures. The residual heat in the incinerated air can heat up the temperature of the exhaust air and reduce the relative humidity thereof The confluence may be processed at higher adsorption efficiency when it is sent through the first adsorption zone for the first adsorption procedure. In other words, the second adsorption-treated air processed by the second rotor 220 is the only air flow expelled to the outside, while the incinerated air is not released to the outside. The VOCs concentration in the expelled air can thus be further lowered.

In a numerical simulation, the purification system 200 is introduced with 2000 SCMM of the exhaust air, which contains 20 ppmv of VOCs. After the exhaust air merges 100 SCMM of the second desorption-treated air and 125 SCMM of the incinerated air, the confluence contains 17.6 ppmv of VOCs. 2100 SCMM of the confluence is sent through the first adsorption zone of the first rotor 210 for the first adsorption procedure. 125 SCMM of the confluence is used as the first desorption air and is sent through the first desorption zone for the first desorption procedure. It is assumed that the VOCs processing efficiency of the first rotor 210 is 95% while the concentration ratio thereof is about 18, that the VOCs processing efficiency of the second rotor 220 is 90% while the concentration ratio thereof is about 19, and that the VOCs processing efficiency of the incinerator 230 is 98%. Under such conditions, 2100 SCMM of the first adsorption-treated air contains only 0.88 ppmv of VOCs. 2000 SCMM of the first adsorption-treated air is then sent through the second adsorption zone of the second rotor 220 for the second adsorption procedure. The second desorption-treated air then contains only 0.09 ppmv of VOCs. 2000 SCMM of the second desorption-treated air is then sent to the chimney 260. On the other hand, 100 SCMM of the first adsorption-treated air is used as the second desorption air and is sent through the second desorption zone of the second rotor 220 for the second desorption procedure. 100 SCMM of the second desorption-treated air is generated with a VOCs concentration of about 17 ppmv, and it is then merged into the exhaust air to increase the air temperature and lower its relative humidity. Furthermore, the first desorption-treated air generated in the first desorption procedure has a VOCs concentration of about 320 ppmv. 125 SCMM of the first desorption-treated air is then sent to the incinerator 230 for the incineration procedure. 15 SCMM of the incinerated air is sent to the first and the second heat exchanger 240, 250 in sequence for heat exchangement, and then rejoins the other 110 SCMM of the incinerated air. Thereafter, 125 SCMM of the incinerated air contains about 6.4 ppmv of VOCs and is then merged into the exhaust air for further treatment.

As a result, 2000 SCMM of the treated air is expelled to the outside with only 0.09 ppmv of VOCs. In other words, more than 99.5% of the VOCs has been removed, which is a very excellent processing efficiency.

Figure 5:
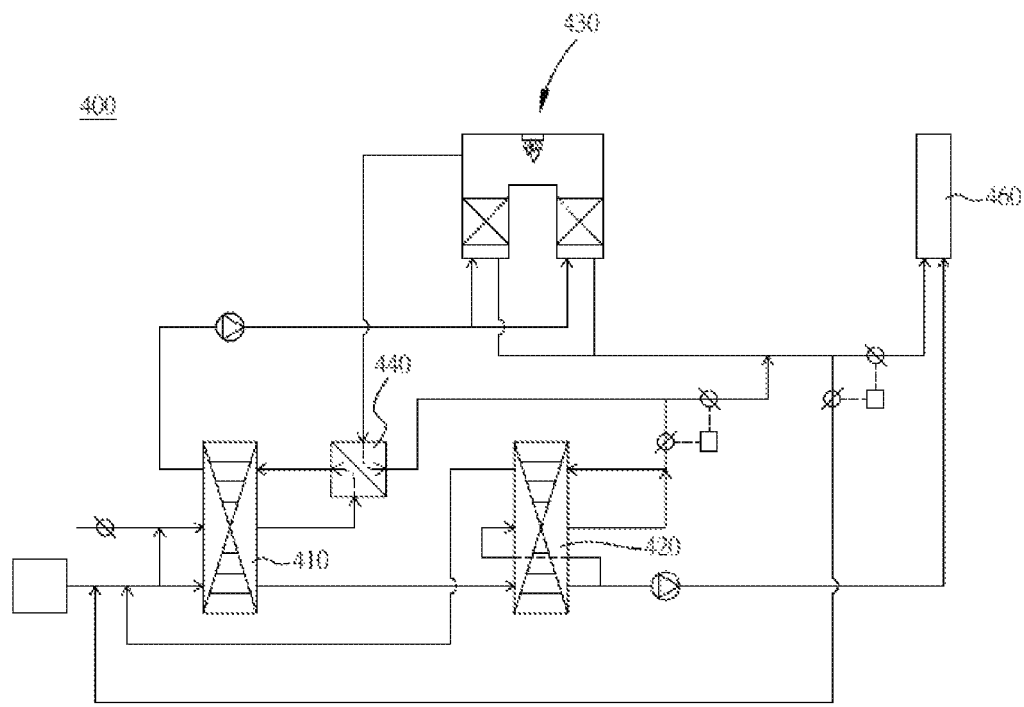
FIG. 5 is a configuration diagram in accordance with the fourth embodiment of the present invention.

Please refer to FIG. 5 for the purification system in accordance with the fourth embodiment of the present invention. The purification system 400 of the present embodiment is different from that of the third embodiment in the fact that the second heat exchanger is omitted, that a part of the second adsorption-treated air is detached and merged with the incinerated air passing through the first heat exchanger 440 to be used as the second desorption air which is then sent through the second desorption zone of the second rotor 420 for the second desorption procedure. The advantage of the present embodiment is that the cost for building and maintaining the second heat exchanger is further saved and the heat energy is utilized more sufficiently for the purpose of energy saving.

In a numerical simulation, the purification system 400 is introduced with 2000 SCMM of the exhaust air, which contains 20 ppmv of VOCs. After the exhaust air merges 115 SCMM of the second desorption-treated air and 110 SCMM of incinerated air, the confluence contains 17.6 ppmv of VOCs. 2100 SCMM of the confluence is sent through the first adsorption zone of the first rotor 410 for the first adsorption procedure. 125 SCMM of the confluence is used as the first desorption air and is sent through the first desorption zone for the first desorption procedure. It is assumed that the VOCs processing efficiency of the first rotor 410 is 95% while the concentration ratio thereof is about 18, that the VOCs processing efficiency of the second rotor 420 is 90% while the concentration ratio thereof is about 19, and that the VOCs processing efficiency of the incinerator 430 is 98%. Under such conditions, 2100 SCMM of the first adsorption-treated contains only 0.88 ppmv of VOCs and is sent through the second adsorption zone of the second rotor 420 for the second adsorption procedure. The VOCs concentration in the processed second adsorption-treated air can be further lowered to 0.09 ppmv. 2000 SCMM of the second adsorption-treated air is sent to the chimney 460. On the other hand, 100 SCMM of the second adsorption-treated air merges 15 SCMM of the incinerated air passing though the first heat exchanger 440 as the second desorption air, which is then sent through the second desorption zone of the second rotor 420 for the second desorption procedure. 115 SCMM of second desorption-treated air can be obtained with 17 ppmv of VOCs contained therein. The second desorption-treated air is merged into the exhaust air to increase the latter's temperature and reduce the latter's relative humidity. Furthermore, the first desorption-treated air generated in the first desorption procedure contains 320 ppmv of VOCs. 125 SCMM of the desorption-treated air is sent through the incinerator 430 for the incineration procedure. 15 SCMM of the high-temperature incinerated air is detached and sent to the first heat exchanger 440 for heat exchangement, and then merges with the afore-mentioned 100 SCMM of the second adsorption-treated air as the second desorption air. On the other hand, the remaining 110

SCMM incinerated air, with 6.4 ppmv of VOCs, is merged into the exhaust air and then sent through the first rotor 410 for the first adsorption procedure.

As a result, the chimney expels treated air at the amount of 2000 SCMM and at a VOCs concentration of 0.09 ppmv. In other words, even though one heat exchanger is omitted in the present embodiment, high processing efficiency can still be achieved as the third embodiment does.

Figure 6:
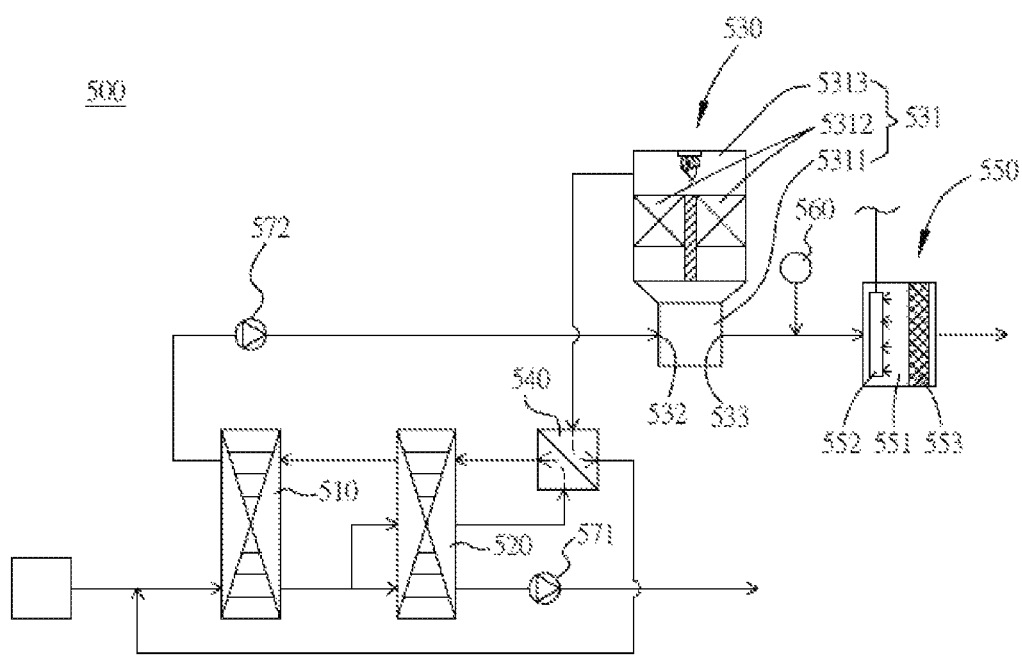
FIG. 6 is a configuration diagram in accordance with the fifth embodiment of the present invention.

Please refer to FIG. 6 for the purification system of the fifth embodiment of the present invention. The purification system 500 includes a first rotor 510, a second rotor 520, an incinerator 530, a heat exchanger 540, a repurification reactor 550 and an ozone supply unit 560.

Figure 7:
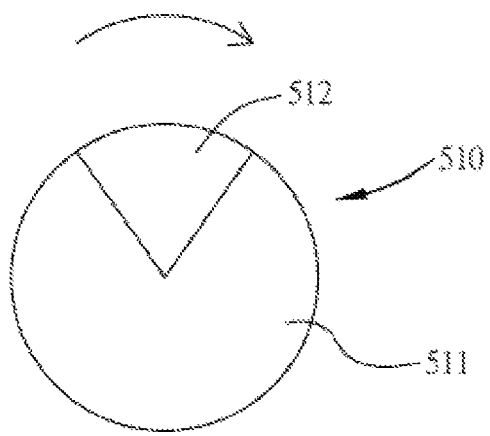
FIG. 7 is a front view of another rotor adapted to be utilized in the present invention.

Please further refer to FIG. 7. When the first rotor 510 is working, it rotates in a rotation direction. The first rotor 10 may be divided into a first adsorption zone 511 and a first desorption zone 512 based on the desired purposes. In the present embodiment, the first rotor 510 is substantially composed of the first adsorption zone 511 and the first desorption zone 512 without a cooling zone. However, the first rotor 510 may still be constructed by frames, a hub, a support base and other units, which are not substantially involved in the adsorption process and the desorption process and are not shown in the drawings.

The second rotor 520 can be divided into a second adsorption zone, a second desorption zone and a second cooling zone based on the desired purposes. The front view of the second rotor is similar to what is shown in FIG. 2. The second cooling zone is located between the second adsorption zone and the second desorption zone. Adsorption material(s) carried by the second rotor 520 can rotate through the second adsorption zone, the second desorption zone and the second cooling zone in sequence.

The incinerator 530 has a combustion unit 531, an intake end 532 and an exhaust end 533. In the present embodiment, the incinerator 530 is a rotary valve regenerative thermal oxidizer, and thus the combustion unit 531 includes a rotary valve 5311, a plurality of regenerative thermal tanks 5312 filled with thermal media, and a combustion chamber 5313. The regenerative thermal tanks 5312 connects the rotary valve 5311 to the combustion chamber 5313. The intake end 532 and the exhaust end 533 is formed on the rotary valve 5311.

The heat exchanger 540 is adapted for two air flows to exchange heat therein. The afore-mentioned "exchange heat" means that thermal energy transfer is made from the hotter air flow to the colder air flow. A part of the incinerated air generated by the combustion unit 531 can be detached from the combustion chamber 5313 and sent through the heat exchanger 540 as the afore-mentioned hotter air flow.

The ozone supply unit 560 is adapted to supply the incinerated air with ozone. The repurification reactor 550 has a reaction chamber 551 and a water supply unit 552. The water supply unit 552 may be, for instance, a nozzle used to increase the moisture content within the reaction chamber 551. The reaction chamber 551 may be further disposed with catalyst material 553.

The purification system 500 can be used in a purification method which includes the following procedures:

[First adsorption procedure] Feeding the VOCs-containing exhaust air through the first adsorption zone 511 of the first rotor 510 in a manner that at least a part of the VOCs within the exhaust air is adsorbed by the adsorption material(s) within the first adsorption zone 511. The processed exhaust air is then expelled from the other side of the first rotor as the first adsorption-treated air.

[Second adsorption procedure] Feeding the first adsorption-treated air through the second adsorption zone of the second rotor 520 in a manner that at least a part of the VOCs within the first adsorption-treated air is adsorbed by the adsorption material(s) within the second adsorption zone. The processed first adsorption-treated air is then expelled from the other side of the second rotor 520 as the second adsorption-treated air. The second adsorption-treated air, processed by two adsorption procedures, contains very small amount of VOCs, and thus the second adsorption-treated air may be expelled, with the help of a fan 571, from the chimney or be utilized otherwise.

[First desorption procedure] The adsorption material(s) adsorbed an adequate amount of VOCs during the first adsorption procedure, and thus the first desorption air is fed through the first desorption zone 512 of the first rotor 510 in a manner that the VOCs adsorbed by the first rotor 510 are desorbed. The processed first desorption air contains higher concentration of VOCs, and is then expelled from the other side of the first rotor 510 as the first desorption-treated air.

[Second desorption procedure] The adsorption material(s) of the second rotor 520 adsorbed an adequate amount of VOCs during the second adsorption procedure, and thus the second desorption air is fed through the second desorption zone of the second rotor 520 in a manner that the VOCs adsorbed by the second rotor 20 are desorbed. The processed second desorption air thus contains higher concentration of VOCs and is then expelled from the other side of the second rotor 520 as the second desorption-treated air. To increase the desorption efficiency, the second desorption air may also be heated to a higher temperature. In the present embodiment, the second desorption air is heated up, before entering the second desorption zone, by feeding it into the second cooling zone for preheatment and then further feeding it into the heat exchanger 540 for heat exchangement with the incinerated air. In the present embodiment, the second desorption air is a detached flow of the first adsorption-treated air. Because the second desorption-treated air is still at higher temperature, it can be sent through the first desorption zone 512 of the first rotor 510 as the first desorption air.

[Incineration procedure] The first desorption-treated air containing higher concentration of VOCs is sent to the combustion unit 531 via the intake end 532 with the help of another fan 572. The combustion unit 531 then incinerate the VOCs within the first desorption-treated air and generate the incinerated air. A part of the incinerated air is expelled via the exhaust end 533, while the other part of the incinerated air is detached from the combustion chamber 5313 of the combustion unit 530 and is used for later heat exchangement which occurs in the heat exchanger 540. Because the incinerated air used for the heat exchangement still contains a small amount of VOCs, it can be sent through the first adsorption zone 511 of the first rotor 510 for further treatment. The incinerated air can be merged in the exhaust air before passing through the first rotor 510.

[Repurification procedure] Feeding ozone into the reaction chamber 551 such that the ozone and the moisture can react in the reaction chamber 551 to generate highly active hydroxyl radicals, which can be used to react with possible $NO_x$ (insoluble in water) in the incinerated air to generate nitric acid (highly soluble in water), to react with possible $SO_x$ (insoluble in water) to generate sulfuric acid (highly soluble in water), or to react with possible high boiling organic suspended solids to generate carbon dioxide and water. Purified air can be thus obtained.

The nature of rotors makes the first adsorption procedure, the second adsorption procedure, the first desorption procedure and the second desorption procedure take place synchronously. In a routine operation, the incineration procedure and the repurification procedure also take place synchronously.

In view of the afore-mentioned method, the second desorption-treated air, expelled from the second rotor 520, and the purified air, generated in the repurification reactor 550, both have a small amount of VOCs and thus can be expelled to the outside directly. Compared with conventional purification system, the present purification system and method can significantly reduce the concentration of VOCs in the treated air without adding additional incinerators. Heat can be sufficiently recovered. Energy conservation can thus be achieved.

Figure 8:
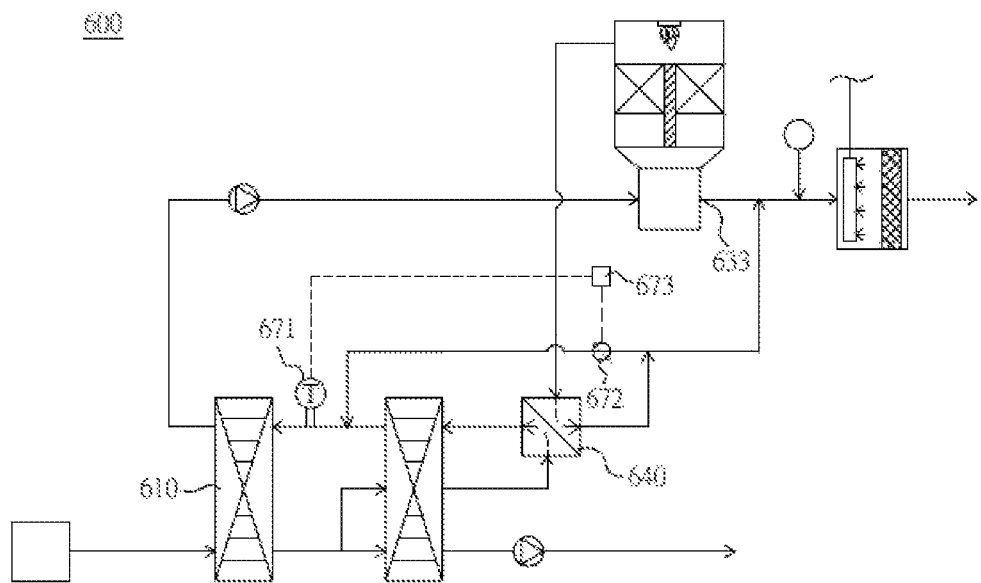
FIG. 8 is a configuration diagram in accordance with the sixth embodiment of the present invention.

Please refer to FIG. 8 for the purification system in accordance with the sixth embodiment of the present invention. The purification system 600 of the present embodiment is partially similar to that of the fifth embodiment, but is different in several ways discussed hereinafter. The incinerated air, after passing through the heat exchanger 640, is no longer sent through the first adsorption zone of the first rotor 610. The purification system 600 further includes a thermal sensor 671, a control valve 672 and a controller 673 in signal connection with the thermal sensor 671 and the control valve 672 respectively. The thermal sensor 671 is adapted to detect the temperature of the first desorption air. The control valve 672 is adapted to adjust a flow rate of the heat-exchanged incinerated air to be detached and merged into the second desorption-treated air. The controller 673 is adapted to request the control valve 672 to adjust the flow rate to the temperature detected by the thermal sensor 671. Those remaining undetached incinerated air rejoins the incinerated air expelled from the exhaust end 633.

In view of the foregoing, the controller 673 may request the control valve 672 to increase the flow rate of the incinerated air to be merged into the second desorption-treated air if the temperature of the first desorption air detected by the thermal sensor 671 is lower than a predetermined working temperature. Because the temperature of the incinerated air is higher than that of the second desorption-treated air, the temperature of the first desorption air can be increased, after the adjustment, until it reaches the predetermined temperature.

Figure 9:
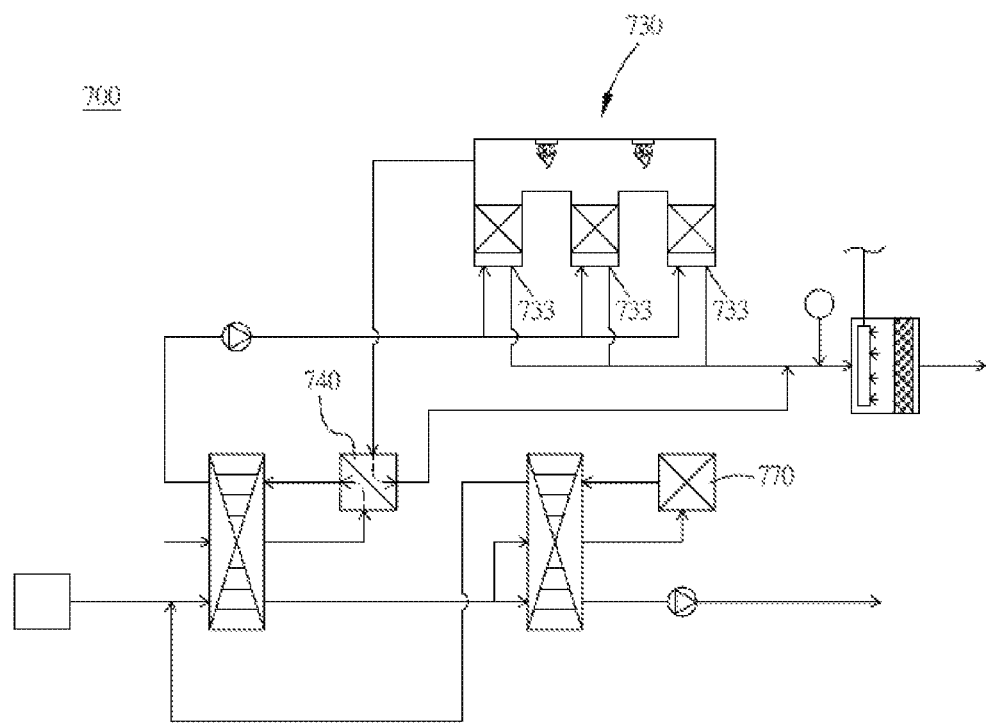
FIG. 9 is a configuration diagram in accordance with the seventh embodiment of the present invention.

Please refer to FIG. 9 for the purification system in accordance with the seventh embodiment of the present invention. The purification system 700 of the present embodiment is partially similar to that of the second embodiment, but is different in several ways discussed hereinafter. The incinerator 730 is a three-tank regenerative thermal oxidizer. The incinerated air which passing through the first heat exchanger 740 is no longer sent through the other heat exchanger but merged into the incinerated air expelled from the exhaust end 733 directly. Instead, the purification system 700 includes an additional heater 770 to heat up the second desorption air. The heater 770 can be, but not limited to, other forms of heat exchangers whose heat source may be steam, hot oil, hot air or electric heat.

Figure 10:
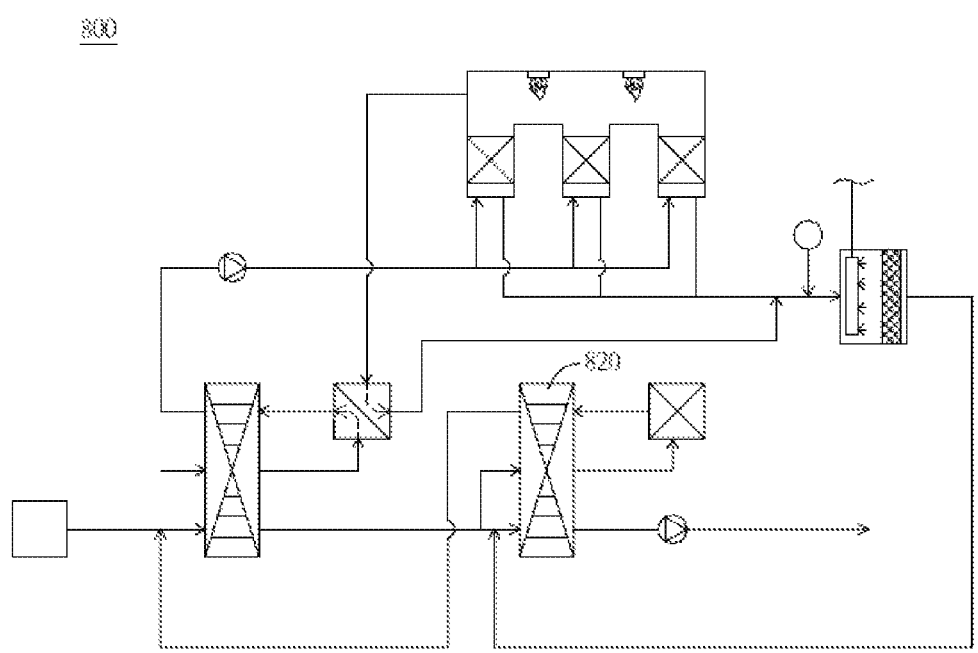
FIG. 10 is a configuration diagram in accordance with the eighth embodiment of the present invention.

Please refer to FIG. 10 for the purification system in accordance with the eighth embodiment of the present invention. The purification system 800 of the present embodiment is partially similar to that of the seventh embodiment, but is different in the fact that the incinerated air is merged with the first adsorption-treated air, and the confluence of the incinerated air and the first adsorption-treated air is sent through the second adsorption zone of the second rotor 820 for the second adsorption procedure. The concentration of VOCs in the confluence can thus be further reduced before it is expelled to the outside.

What is claimed is:

1. A serial-rotor type high efficiency purification system for processing exhaust air containing VOCs, comprising:
    a first rotor, having a first adsorption zone and a first desorption zone, the first adsorption zone being adapted for the exhaust air to be sent therethrough in a manner that at least a part of the VOCs within the exhaust air are adsorbed, the first adsorption zone being adapted to expel the exhaust air as a first adsorption-treated air, the first desorption zone being adapted for a first desorption air to be sent therethrough in a manner that the VOCs adsorbed by the first rotor are desorbed, the first desorption zone being adapted to expel the first desorption air as a first desorption-treated air;
    a second rotor, having a second adsorption zone and a second desorption zone, the second adsorption zone being adapted for the first adsorption-treated air to be sent therethrough in a manner that at least a part of the VOCs within the first adsorption-treated air are adsorbed, the second adsorption zone being adapted to expel the first adsorption-treated air as a second adsorption-treated air, the second desorption zone being adapted for a second desorption air to be sent therethrough in a manner that the VOCs adsorbed by the second rotor are desorbed, the second desorption zone being adapted to expel the second desorption air as a second desorption-treated air; and
    an incinerator, having a combustion unit, an intake end and an exhaust end, the intake end and the exhaust end being both in communication with the combustion unit, the intake end being adapted for the first desorption-treated air to be sent through the combustion unit via the intake end, the combustion unit being adapted to incinerate the VOCs within the first desorption-treated air and then generate an incinerated air, the exhaust end being adapted to expel at least a part of the incinerated air;
    wherein the second desorption-treated air expelled from the second desorption zone is sent through the first adsorption zone of the first rotor.

2. The serial-rotor type high efficiency purification system of claim 1, wherein the first rotor further has a first cooling zone between the first adsorption zone and the first desorption zone, the first cooling zone is adapted for the first desorption air to be sent therethrough before the first desorption air is sent through the first desorption zone.

3. The serial-rotor type high efficiency purification system of claim 1,
    wherein the second rotor further has a second cooling zone between the second adsorption zone and the second desorption zone, the second cooling zone is adapted for the second desorption air to be sent therethrough before the second desorption air is sent through the second desorption zone.

4. The serial-rotor type high efficiency purification system of claim 1, further comprising a first heat exchanger adapted for a part of the incinerated air detached from the combustion unit to be sent therethrough, the first heat exchanger being adapted for the first desorption air to be sent therethrough in a manner that the first desorption air and the detached incinerated air exchange heat with each other before the first desorption air is sent through the first desorption zone.

5. The serial-rotor type high efficiency purification system of claim 4, further comprising a second heat exchanger adapted for a part of the incinerated air detached from the combustion unit to be sent therethrough, the second heat exchanger being adapted for the second desorption air to be sent therethrough in a manner that the second desorption air and the detached incinerated air exchange heat with each other before the second desorption air is sent through the second desorption zone.

6. The serial-rotor type high efficiency purification system of claim 5, wherein the detached incinerated air is sent through the first heat exchanger and the second heat exchanger in sequence.

7. The serial-rotor type high efficiency purification system of claim 5, wherein the detached incinerated air sent through at least one of the first and the second heat exchangers rejoins the incinerated air expelled from the exhaust end.

8. The serial-rotor type high efficiency purification system of claim 1, wherein the incinerated air is sent through the first adsorption zone of the first rotor.

9. The serial-rotor type high efficiency purification system of claim 7, wherein the confluence of the incinerated air is sent through the first adsorption zone of the first rotor.

10. The serial-rotor type high efficiency purification system of claim 1, wherein a part of the incinerated air is detached from the combustion unit, a part of one of the first and the second adsorption-treated air is detached and merged with the incinerated air detached from the combustion unit to form the second desorption air.

11. The serial-rotor type high efficiency purification system of claim 1, further comprising a heater adapted to increase the temperature of the second desorption air.

12. The serial-rotor type high efficiency purification system of claim 1, wherein at least a part of the incinerated air is sent through the first adsorption zone, the first desorption zone, the second adsorption zone or the second desorption zone.

13. The serial-rotor type high efficiency purification system of claim 1, wherein a part of the first adsorption-treated air is detached as the second desorption air.

14. A serial-rotor type high efficiency purification system for processing exhaust air containing VOCs, comprising:
a first rotor, having a first adsorption zone and a first desorption zone, the first adsorption zone being adapted for the exhaust air to be sent therethrough in a manner that at least a part of the VOCs within the exhaust air are adsorbed, the first adsorption zone being adapted to expel the exhaust air as a first adsorption-treated air, the first desorption zone being adapted for a first desorption air to be sent therethrough in a manner that the VOCs adsorbed by the first rotor are desorbed, the first desorption zone being adapted to expel the first desorption air as a first desorption-treated air;
a second rotor, having a second adsorption zone and a second desorption zone, the second adsorption zone being adapted for the first adsorption-treated air to be sent therethrough in a manner that at least a part of the VOCs within the first adsorption-treated air are adsorbed, the second adsorption zone being adapted to expel the first adsorption-treated air as a second adsorption-treated air, the second desorption zone being adapted for a second desorption air to be sent therethrough in a manner that the VOCs adsorbed by the second rotor are desorbed, the second desorption zone being adapted to expel the second desorption air as a second desorption-treated air; and
an incinerator, having a combustion unit, an intake end and an exhaust end, the intake end and the exhaust end being both in communication with the combustion unit, the intake end being adapted for the first desorption-treated air to be sent through the combustion unit via the intake end, the combustion unit being adapted to incinerate the VOCs within the first desorption-treated air and then generate an incinerated air, the exhaust end being adapted to expel at least a part of the incinerated air;
wherein a part of the second adsorption-treated air is detached as the second desorption air.

15. The serial-rotor type high efficiency purification system of claim 14, further comprising a heat exchanger adapted for a part of the incinerated air detached from the combustion unit to be sent therethrough, the heat exchanger being adapted for the second desorption air to be sent through in a manner that the second desorption air and the detached incinerated air exchange heat with each other before the second desorption air is sent through the second desorption zone, at least a part of the heat-exchanged incinerated air merges the second desorption-treated air and is then sent through the first desorption zone as the first desorption air.

16. The serial-rotor type high efficiency purification system of claim 15, further comprising a thermal sensor, a control valve and a controller, the controller being in signal connection with the thermal sensor and the control valve, the thermal sensor being adapted to detect the temperature of the first desorption air, the control valve being adapted to adjust a flow rate of the heat-exchanged incinerated air to be merged into the second desorption-treated air, the controller being adapted to request the control valve to adjust the flow rate to the temperature detected by the thermal sensor.

17. A serial-rotor type high efficiency purification system for processing exhaust air containing VOCs, comprising:
a first rotor, having a first adsorption zone and a first desorption zone, the first adsorption zone being adapted for the exhaust air to be sent therethrough in a manner that at least a part of the VOCs within the exhaust air are adsorbed, the first adsorption zone being adapted to expel the exhaust air as a first adsorption-treated air, the first desorption zone being adapted for a first desorption air to be sent therethrough in a manner that the VOCs adsorbed by the first rotor are desorbed, the first desorption zone being adapted to expel the first desorption air as a first desorption-treated air;
a second rotor, having a second adsorption zone and a second desorption zone, the second adsorption zone being adapted for the first adsorption-treated air to be sent therethrough in a manner that at least a part of the VOCs within the first adsorption-treated air are adsorbed, the second adsorption zone being adapted to expel the first adsorption-treated air as a second adsorption-treated air, the second desorption zone being adapted for a second desorption air to be sent therethrough in a manner that the VOCs adsorbed by the second rotor are desorbed, the second desorption zone being adapted to expel the second desorption air as a second desorption-treated air; and
an incinerator, having a combustion unit, an intake end and an exhaust end, the intake end and the exhaust end being both in communication with the combustion unit, the intake end being adapted for the first desorption-treated air to be sent through the combustion unit via the intake end, the combustion unit being adapted to incinerate the VOCs within the first desorption-treated air and then generate an incinerated air, the exhaust end being adapted to expel at least a part of the incinerated air;

wherein the second desorption-treated air is used as the first desorption air and sent through the first desorption zone.

18. The serial-rotor type high efficiency purification system of claim 17, further comprising a heat exchanger adapted for a part of the incinerated air detached from the combustion unit to be sent therethrough, the heat exchanger being adapted for the second desorption air to be sent therethrough in a manner that the second desorption air and the detached incinerated air exchange heat with each other before the second desorption air is sent through the second desorption zone.

19. The serial-rotor type high efficiency purification system of claim 17, wherein the first rotor is substantially composed of the first adsorption zone and the first desorption zone.

\* \* \* \* \*